United States Patent
Pickhard et al.

(10) Patent No.: US 6,205,401 B1
(45) Date of Patent: Mar. 20, 2001

(54) NAVIGATION SYSTEM FOR A VEHICLE, ESPECIALLY A LAND CRAFT

(75) Inventors: Friedhelm Pickhard, Düren; Detlev Wick, Walldorf, both of (DE)

(73) Assignee: Litef GmbH (DE)

( * ) Notice: Subject to any disclaimer, the term of this patent is extended or adjusted under 35 U.S.C. 154(b) by 0 days.

(21) Appl. No.: 09/029,165

(22) PCT Filed: Sep. 5, 1996

(86) PCT No.: PCT/EP96/03907

§ 371 Date: Mar. 19, 1998

§ 102(e) Date: Mar. 19, 1998

(87) PCT Pub. No.: WO97/11334

PCT Pub. Date: Mar. 27, 1997

(30) Foreign Application Priority Data

Sep. 19, 1995 (DE) ............................................... 195 36 601

(51) Int. Cl.⁷ .................................. G06G 7/78; G01S 5/00
(52) U.S. Cl. ............................. 701/220; 702/94; 342/358
(58) Field of Search .................................... 701/213, 214, 701/216, 217, 220, 221; 33/318, 326, 328; 702/92, 94; 342/358

(56) References Cited

U.S. PATENT DOCUMENTS

| | | | |
|---|---|---|---|
| 3,702,477 | * 11/1972 | Brown | 343/112 C |
| 5,166,882 | * 11/1992 | Stambaugh | 364/453 |
| 5,416,712 | * 5/1995 | Geier et al. | 364/450 |
| 5,452,211 | * 9/1995 | Kyrtsos et al. | 364/449 |
| 5,606,506 | * 2/1997 | Kyrtsos | 364/449.1 |
| 5,740,048 | * 4/1998 | Abel et al. | 364/443 |
| 5,902,351 | * 5/1999 | Streit et al. | 701/220 |

FOREIGN PATENT DOCUMENTS

| | | |
|---|---|---|
| 3229819 | 2/1984 | (DE) . |
| 0161668 | 11/1985 | (EP) . |
| 0496508 | 7/1992 | (EP) . |

* cited by examiner

*Primary Examiner*—Tan Nguyen
*Assistant Examiner*—Dalena Tran

(57) ABSTRACT

The invention relates to a navigation system for a vehicle, in particular for a land vehicle, having at least one single-axis gyro for the vehicle vertical axis (z axis), having two accelerometers in the horizontal vehicle plane (x axis, y axis), and having a vehicle-axis velocity measurement device, for example, a distance-travelled sensor. In addition, supporting signal devices, in particular a satellite receiver and/or a map, are available as well as a controller, which uses a suitable Kalman filter to determine the vehicle position and/or the direction of travel from the measured and stored signals. The Kalman filter is assigned at least one partial filter, of which a first partial filter is used for dynamic levelling and/or a second partial filter is designed as a position filter which provides track calibration, position calibration and sensor calibration.

16 Claims, 7 Drawing Sheets

NAVIGATION SYSTEM FOR A VEHICLE, ESPECIALLY A LAND CRAFT

FIELD OF THE INVENTION

The present invention relates to navigation systems for vehicles. More particularly, the present invention pertains to navigation systems for land vehicles.

DESCRIPTION OF THE PRIOR ART

It is known to equip vehicles with navigation systems that allow position and direction to be determined. So-called strapdown inertial systems, equipped with vehicle-fixed inertial sensors, have been employed for this purpose. Accelerometers and gyros dedicated to the axes of a vehicle-fixed Cartesian coordinate system are normally employed as the sensors. The coordinate system axes in such cases are defined so that an x axis and a y axis lie in the horizontal vehicle plane, while a z axis coincides with the vertical axis of the vehicle. Typical applications of such inertial systems are found in integrated navigation systems, inertial navigation systems and track/attitude reference systems. In a commonly-employed track/attitude calculation, track/attitude information relating to the vehicle is determined (e.g. a direction cosine matrix) by means of the gyros assigned to the individual coordinate system axes. A dead reckoning navigation can be calculated in a known manner by associating the direction cosine matrix to measured vehicle-fixed velocity. The vehicle-fixed velocity measurement in such case is also employed as an augmenting measurement for determining vehicle attitude. The vehicle track and position determined in such a way are interpreted with augmenting information that may only be available to a limited extent. For this purpose, the vehicle may be equipped with receivers for satellite navigation systems (e.g. GPS) that make velocity and/or position measurements available. Alternatively, position coordinates from maps can also be used for augmentation as it is irrelevant for such applications whether the position information is obtained from a digital map or from a paper map. Employing such augmenting information, position and velocity measurements can be compared with the signals derived from autonomous on-board measurements and the difference signals supplied as observations to a Kalman filter that contains a linearized model of the algorithms for calculating the navigation data for the navigation system. The Kalman filter is employed to estimate corrections for the navigation parameters and for calibration of the navigation system sensors.

As a result of the non-linearity of the track/attitude calculation of the navigation system on the one hand and the linear approximation in the model equations of the Kalman filter on the other hand, estimates may be subject to errors when the filter is operated beyond the permissible linear operating range.

SUMMARY OF THE INVENTION

The present invention addresses the foregoing and other disadvantages of the prior art by providing an improvement in a navigation system for a vehicle. The navigation system is of the type having at least one single-axis gyro for the vehicle vertical axis, x and y axis accelerometers in the horizontal vehicle plane, a vehicle-fixed velocity measurement device and an augmentation device, especially a satellite navigation receiver and/or a map device supporting position and/or velocity of the vehicle, and a controller employing a suitable Kalman filter to connect the calculated vehicle position and/or direction of travel from measured signals. The measured signals are supplied from the augmentation device and stored.

The improvement provided by the invention includes at least one partial filter assigned to the Kalman filter. Such partial filter comprises a first partial filter for dynamic levelling and a second partial filter which, as a position filter, provides track calibration, position calibration and sensor calibration.

The advantage of this filter structure is the reduction of systematic errors implied by the reduced sensor computation (i.e. the lack of x and y gyros in the horizontal plane).

The preceding and other features and advantages of this invention will become further apparent from the detailed description that follows. Such description is accompanied by a set of drawing figures. In the drawing figures numerals, corresponding to numerals of the written description, indicate features of the invention with like numerals referring to like features throughout both the written description and the drawing figures.

DETAILED DESCRIPTION OF THE PREFERRED EMBODIMENT

Figure 1:
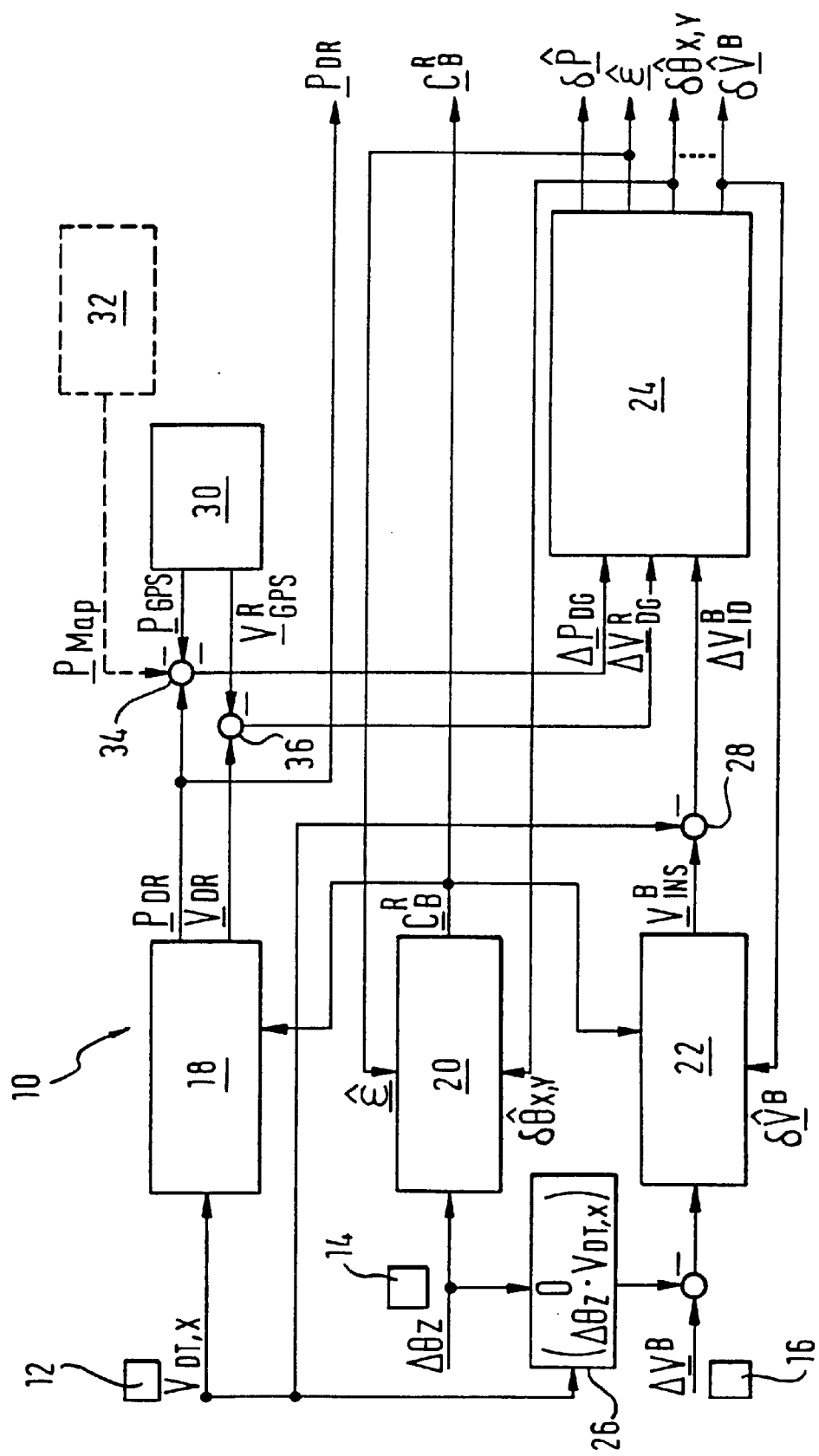
FIG. 1 is a block diagram of a signal processing structure for a navigation system having a sensor configuration according to the invention.

FIG. 1 is a block diagram of a signal processing structure for a navigation system, designated generally by the numeral 10, for a vehicle (not shown).

Exemplary embodiments which follow assume a land vehicle (e.g. a motor vehicle). The navigation system 10 possesses autonomous on-board vehicle-axis measurement devices, illustrated to the left in FIG. 1, and measurement devices, illustrated to the right, for providing measurement signals in a time-constrained manner. Vehicle-axis measurement devices include a distance-travelled sensor 12, a single-axis gyro 14 assigned to the vertical vehicle axis ("z axis") and accelerometers 16, assigned to the x and y axes respectively of the horizontal vehicle plane. The distance-travelled sensor 12, the gyro 14 and the accelerometers 16 supply signals dependent upon the respective vehicle state that are fed, in a manner to be explained, to an integrated navigation calculation device 18, a track/attitude calculation device 20 and a velocity calculation device 22. The track/attitude calculation device 20 employs the signals from the z gyro 14 to input a direction cosine matrix $C^R_B$. Due to the absence of x and y gyros, the rotation rates, supplied by a Kalman filter 24 as estimated values, of such axes are provided in a manner explained below.

The accelerometers 16 supply the velocity calculation device 22 with acceleration signals occurring in the x and y directions. Such acceleration signals have been subjected to a Coriolis correction device 26 (in vehicle-axis coordinates) and adjusted to take account of Coriolis accelerations caused by direction of motion and, thus, of acceleration, that do not coincide precisely with the x, y and z axes. In the exemplary embodiment, it is assumed that Coriolis accelerations induced by the earth's rotation are negligible. The Coriolis correction device 26 in such case processes signals made available by the distance-travelled sensor 12 and the z gyro 14. Since the absence of the x gyro and y gyro means that they cannot provide any signals, the vehicle Coriolis correction is calculated using the matrix shown below:

$$\Delta \underline{\theta}^B \times \underline{v}^B = \begin{pmatrix} -\Delta\theta_z v \nearrow_y^0 + \Delta\theta_y v \nearrow_z^0 \\ \Delta\theta_z v_x - \Delta\theta_x v \nearrow_z^0 \end{pmatrix}$$

The lack of an x or y gyro means that the matrix for calculating the Coriolis correction for the vehicle x and y axes is simplified as follows:

$$(\Delta\theta_z^0 \cdot v_{DT\cdot x})$$

The velocity calculation device 22 employs the accelerometer signals corrected in this way to calculate the inertial velocity $V_{INS}$ of the vehicle. The inertial velocity value is fed to a subtraction element 28 which is, at the same time, supplied with the distance-travelled sensor velocity provided by the distance travelled sensor 12. The resultant difference from the distance-travelled sensor velocity is supplied to the Kalman filter 24 for monitoring. Such monitoring is employed as attitude support for the navigation calculation.

Instead of the inertial velocity and the monitoring resulting from it being calculated as explained herein in vehicle axes, an exemplary embodiment (not illustrated) also allows earth-axis attitude supporting information to be determined and provided. However, in that case the calculation is complicated by the compensation with earth-axis coordinate points. The velocity calculation device 22 is then supplemented with the direction cosine matrix $C^R_B$ and an estimated value of the velocity supplied from the Kalman filter 24.

In the illustrated configuration of vehicle-axis measurement devices, the Kalman filter 24 performs inter alia, the tasks of supplying estimated values for the missing rotation rate measurements in the vehicle-axis horizontal plane, (i.e. the x and y directions) and feeding such estimated values back virtually continuously with suitable bandwidth to the track/attitude calculation device 20 and the velocity calculation device 22. The virtually-continuous feedback of estimated values to the calculation process of the navigation algorithm guarantees a link to the dynamics of the estimated values of horizontal rotation rate. Instead of the virtually-continuous provision of dynamic estimated values of the rotation rates, an equivalent estimated value (e.g., the angular increments of the horizontal vehicle axes), may likewise be used.

The integrated navigation calculation device 18 is supplied with signals from the distance-travelled sensor 12 as well as the direction cosine matrix from the track-attitude calculation device 20. The device 18 employs the available signals to calculate the position signal P and the velocity signal V. The position signal P supplied by the integrated navigation calculation device 18 and the direction cosine matrix $C^R_B$ supplied by the track/attitude calculation device 20 provide the uncorrected navigation data (i.e. position, track and attitude of the vehicle) of the overall navigation system 10.

The track and position are supported by supporting information provided, for example, via a GPS receiver 30 and/or stored map positions 32. The GPS receiver 30 comprises part of a global satellite navigation system the provides position and velocity signals. The map 32 similarly allows one to determine a position signal. Depending upon the method, supporting information is available solely in a time-constrained manner as GPS reception may be subject to interference by, for example, shadowing. Map points may be used for support only when they can be identified in the terrain.

The position and velocity signals supplied by the GPS receiver 30 and/or the map 32 are compared via subtraction elements 34 and 36, respectively, with the vehicle-axis position and velocity signals supplied by the integrated navigation device 18. The difference between them is fed to the Kalman filter 24 for monitoring.

The Kalman filter 24 is based on a linearized model of the algorithms in the navigation system 10 and performs the task of estimating corrections for the output parameters of the navigation system 10 and for calibration of the measurement devices of the navigation system 10.

The missing rotation rate measurements in the vehicle-axis horizontal plane can be estimated by means of a modification (i.e. a definition or arrangement of the required error states) to the Kalman filter 24. In a preferred application, the Kalman filter 24 is modified so that the error states of attitude error (direction cosine matrix parameter), angular increment error and velocity error each has its origin in the x and y axes located on the vehicle-axis horizontal vehicle plane. The six error states form a partial filter of the Kalman filter 24 that provides dynamic levelling as the basis for estimating the horizontal rotation rates about the x and y axes. In this case, the error states are defined as two attitude parameterizing errors $\sigma c_{31}$, $\sigma c_{32}$, two angular incremental errors $\sigma \theta_{x,y}$ and two velocity errors $\sigma v_{x,y}$. The attitude parameter errors are additive, relating to the associated direction cosine matrix elements $c_{31} = -\sin\theta$, $c_{32} = \sin\phi\cos\theta$, defined by $\phi$ and $\theta$ as the roll and pitch angles.

The following describes a discrete error model for the partial filter of the Kalman filter 24 for dynamic levelling as a sixth order error model with a discrete-time formulation.

$$\begin{bmatrix} \delta c_{31} \\ \delta \theta_y \\ \delta v_x \\ \delta c_{32} \\ \delta \theta_z \\ \delta v_y \end{bmatrix}_k = \begin{bmatrix} 1 & -c_{33} & 0 & \Delta\theta_z & 0 & 0 \\ 0 & 1 & 0 & 0 & 0 & 0 \\ g\Delta T & 0 & 1 & 0 & 0 & 0 \\ -\Delta\theta_z & 0 & 0 & 1 & c_{33} & 0 \\ 0 & 0 & 0 & 0 & 1 & 0 \\ 0 & 0 & 0 & g\Delta T & 0 & 1 \end{bmatrix}_{k-1} \cdot \begin{bmatrix} \delta c_{31} \\ \delta \theta_y \\ \delta v_x \\ \delta c_{32} \\ \delta \theta_z \\ \delta v_y \end{bmatrix}_{k-1} + \underline{w}_{k-1}$$

$$\delta \underline{x}_k = \Phi_{k-1} \qquad \delta \underline{x}_{k-1} + \underline{w}_{k-1}$$

$$\begin{bmatrix} \Delta v_x \\ \Delta v_y \end{bmatrix}_k = \begin{bmatrix} 0 & 0 & 1 & 0 & 0 & 0 \\ 0 & 0 & 0 & 0 & 0 & 1 \end{bmatrix} \cdot \delta_{\underline{x}_k} + \underline{v}_k$$

As already mentioned, the difference between the vehicle-axis inertial velocity (from the velocity calculation device 22) and the distance-travelled sensor velocity (from the distance-travelled sensor 12) is defined as the monitor $\Delta V_{x,y}$:

$$\Delta \underline{v}^B_{ID} = \underline{v}^B_{INS} - \underline{v}^B_{DT} = (\Delta v_x \Delta v_y)^T$$

With regard to the design and integration of the partial filter for dynamic levelling within the Kalman filter 24, the stochastic model must carefully modulate those measurement disturbances capable of being interpreted as dynamic disturbances with respect to the attitude information of the acceleration signal. It is necessary to take the availability of the distance-travelled sensor velocity into account as the information medium for translation movement.

The filter estimated values from the partial filter for dynamic levelling are fed back virtually continuously to the track/attitude calculation device 20 of the navigation system 10. In the illustrated example, the estimated error values are provided, as an angular increment correction $\Delta\Theta_{x,y}$ as rotation rate estimates for the x and y gyros missing from the instrumentation. However, other algorithm implementations are also feasible for applying corrections to the track-attitude calculation device 20. The following illustrates the correction equation as an angular increment estimate for process feedback based on the estimated values from the partial filter for dynamic levelling of the Kalman filter 24.

$$\begin{pmatrix}\Delta\theta_x\\\Delta\theta_z\end{pmatrix}_K = f\left[\begin{pmatrix}\delta c_{31}\\\delta c_{32}\end{pmatrix}_K ; \begin{pmatrix}\delta\theta_z\\\delta\theta_y\end{pmatrix}_K ; \Delta\theta_{z,K} ; \underline{c}^R_{B,K-1}\right]$$

Figure 2:
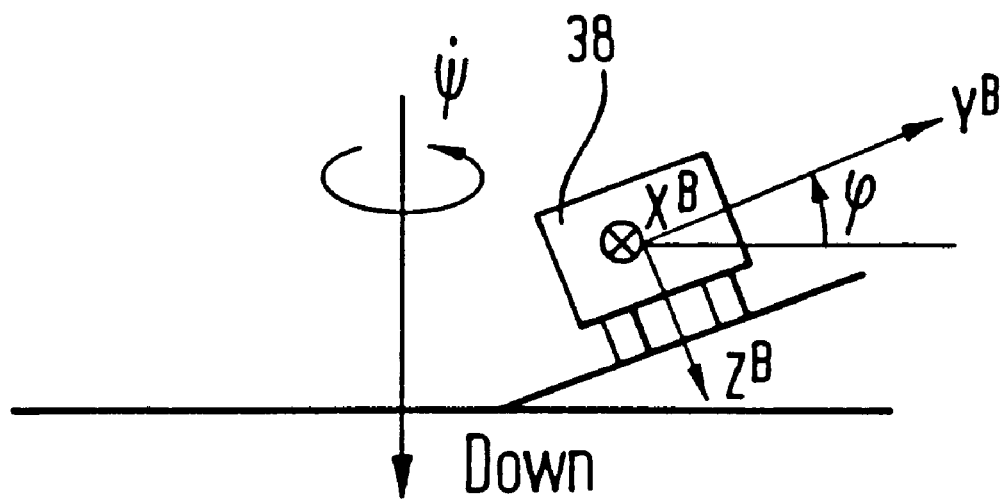
FIG. 2 illustrates one possible state of a vehicle.

The following text explains in greater detail the necessity for rotation rate estimation on the vehicle-axis horizontal plane and the method of operation in conjunction with the non-linear track/attitude calculation device based on a specific vehicle maneuver. FIG. 2 illustrates a possible state of a vehicle 38 turning on a schematically indicated camber. In FIG. 2, $x^B$, $y^B$ and $z^B$ designate the vehicle x, y and z axes respectively. The roll angle $\phi$ between the horizontal and the y axis is assumed constant. The pitch angle $\phi$ in the x axis is zero, while the angular velocity $\Psi$ in the z axis of the vehicle 38 is assumed constant. Thus, in the maneuver illustrated in FIG. 2, steady rotation rates $\omega_{y,z}$ occur in the vehicle y and z axes, and the overall rotation rate vector $\omega$ can be represented as follows:

$$\underline{\omega}^B = \begin{pmatrix} 0 \\ \Psi\sin\varphi \\ \Psi\cos\varphi \end{pmatrix}$$

The magnitude of any azimuth error is important for vehicle navigation. The following describes azimuth error equations for various measurement devices, particularly rotation rate measurement devices, fitted to the vehicle 38. For the situation in which a rotation rate measurement is envisioned about the horizontal y axis of the vehicle 38, the error model equation is as follows:

$$\frac{\Delta\Psi}{\omega_z} \approx -\varphi \cdot \frac{b_y}{g} + \varphi^2 \overset{\approx 0}{\nearrow} \delta SF_{G,y} + \delta SF_{G,z}$$

the typical error budget, described further below, is:

$$\frac{\Delta\Psi}{\omega_z} \approx 1{,}400 \text{ ppm}$$

For a second case, it is assumed that there is no rotation rate measurement about the y axis and, thus, no rotation rate estimation about the y axis. This results in the following error model equation:

$$\frac{\Delta\Psi}{\omega_z} \approx -\varphi 2 + \delta SF_{G,z}$$

the typical error budget being $$\frac{\Delta\Psi}{\omega_z} \approx 10{,}000 \text{ ppm}$$

In a third case, related to the invention, there is no rotation rate measurement in the vehicle-axis y direction, but the rotation rate in the y axis is estimated, yielding the following error model equation:

$$\frac{\Delta\Psi}{\omega_z} \approx -2\varphi \cdot \frac{by}{g} + \delta SF_{G,Z}$$

the typical error budget being $$\frac{\Delta\Psi}{\omega_z} \approx 2.200 \text{ ppm}$$

For the typical error budget, the assumed individual errors are: $\delta SF_{y,z}$ (scale factor error of the y and z gyros) 1000 ppm, $b_y$ (bias of the y accelerometer) 10 mg and $\phi$ (roll angle) 0.1 rad.

A comparison of the error model equations shows that, for single-axis gyro instrumentation with rotation rate estimation, the error dependent on the accelerometer bias is admittedly twice that of three-axis rotation rate measurement. However, the dominant error, dependent upon the square of the roll angle, disappears in the case of single-axis rotation rate measurement without rotation rate estimation. The use of rotation rate estimation in accordance with the invention for the numerical example of a typical error budget, as set forth above, results in a reduction of the azimuth error by a factor of about 5 for a single-axis rotation rate measurement, while the azimuth error for the turn on a camber shown in FIG. 2 increases only slightly in comparison to the three-axis rotation rate measurement.

The maneuver of turning on a camber serves only as an example. When, for example, the vehicle 38 is driven in a typical manner of off-road contours with pitch and roll angles that vary simultaneously this produces maneuvers for which the non-linear characteristic of the track-attitude calculation device 20 is important. For such maneuvers, the use of the dynamic levelling filter of the invention as a partial filter within the Kalman filter 24 with rotation rate estimate yields comparable improvements in error estimation. Overall, feeding back the error estimate to the track/attitude calculation device 20 thus provides the capability of avoiding, or reducing, in particular those errors caused by the non-linear character of the track/attitude calculation device 20 despite limited vehicle instrumentation (e.g. with equipment comprising only a z gyro and accelerometers on the vehicle horizontal axes). Use of the dynamic leveling filter allows the rotation rate components on the vehicle-axis horizontal plane to be estimated with a bandwidth matched to the respective application.

Consequently, the example is based on dynamic levelling using a partial filter within the Kalman filter 24 based on the sixth order discrete error model. Variations in this error model with respect to modified quantization approximations are possible. The calculation of estimated values of the discrete angular increments in the vehicle x and y axes may be used in conjunction with gyro measurement in the z direction as an input signal for the track/attitude calculation device 20. Alternative forms of processing of the estimated values from the Kalman filter 24 (i.e. from the partial filter for dynamic levelling) are feasible in the track/attitude calculation device 20. Furthermore, the stochastic model for the Kalman filter 24 may be adaptively designed. One preferred application is frequency-band-selective assessment of the translational disturbances in the acceleration measurements.

The error state of the described error model may be alternatively defined. For example, the order may be reduced to a fourth order partial filter by ignoring the error states of the angular increment errors, or through transformation of the attitude errors, rotation rate errors and velocity errors into other presentation forms.

The partial filter for dynamic levelling may also be included within the overall Kalman filter 24 so that, overall, the Kalman filter 24 can retain its function in the navigation system 10. It is also possible to split the partial filter for dynamic levelling into two partial filters related to two orthogonal axes. In this case, the couplings between the two partial filters can be ignored for filter design, although such couplings must be taken into account, as deterministic input signals, in the implementation of the estimated error equations. With regard to the disclosed error model, ignoring the couplings results in the possibility of designing two third order partial filters, for example, as pitch angle and roll angle filters, as steady-state Kalman filters since the associated third order error modules are virtually constant over time. However, it is important to take into account the $\delta\Theta_z$ in the implementation of the estimation equations.

The following is based upon a second partial filter in the Kalman filter 24, used for position and azimuth correction as well as for sensor calibration. The second partial filter relates to the error states of position error, azimuth error, z gyro error (drift, scale factor error) and the scale factor error from the distance-travelled sensor. The second partial filter thus represents a sixth order filter and provides track calibration, position correction calibration and sensor calibration. The second partial filter (which is referred to as the position filter) in the Kalman filter 24 may be important outside the permissible operating range of its linear model for initial commissioning or for vehicle transportation with the navigation system 10 switched off. Monitoring the linear operating range of the position filter allows automatic initialization of the position filter with the associated error states requiring initialization. In this case, it is necessary to distinguish between the operating states of the position filter (i.e. the operating states when the vehicle is in motion and stationary). The vehicle state can be detected by a monitoring algorithm in the individual measurement devices of the navigation system 10. (The detection of the vehicle state is not described in any greater detail.)

The error analysis according to the invention is based on a transformed form of the error model of the position filter (i.e. of the second partial filter in the Kalman filter 24) with the following modified error states.

The position errors are transformed from an earth-axis representation, $\delta\phi$ and $\delta\lambda$, into a vehicle-axis representation $\delta\rho_{x,y}$ projected onto the horizontal plane.

Figure 3:
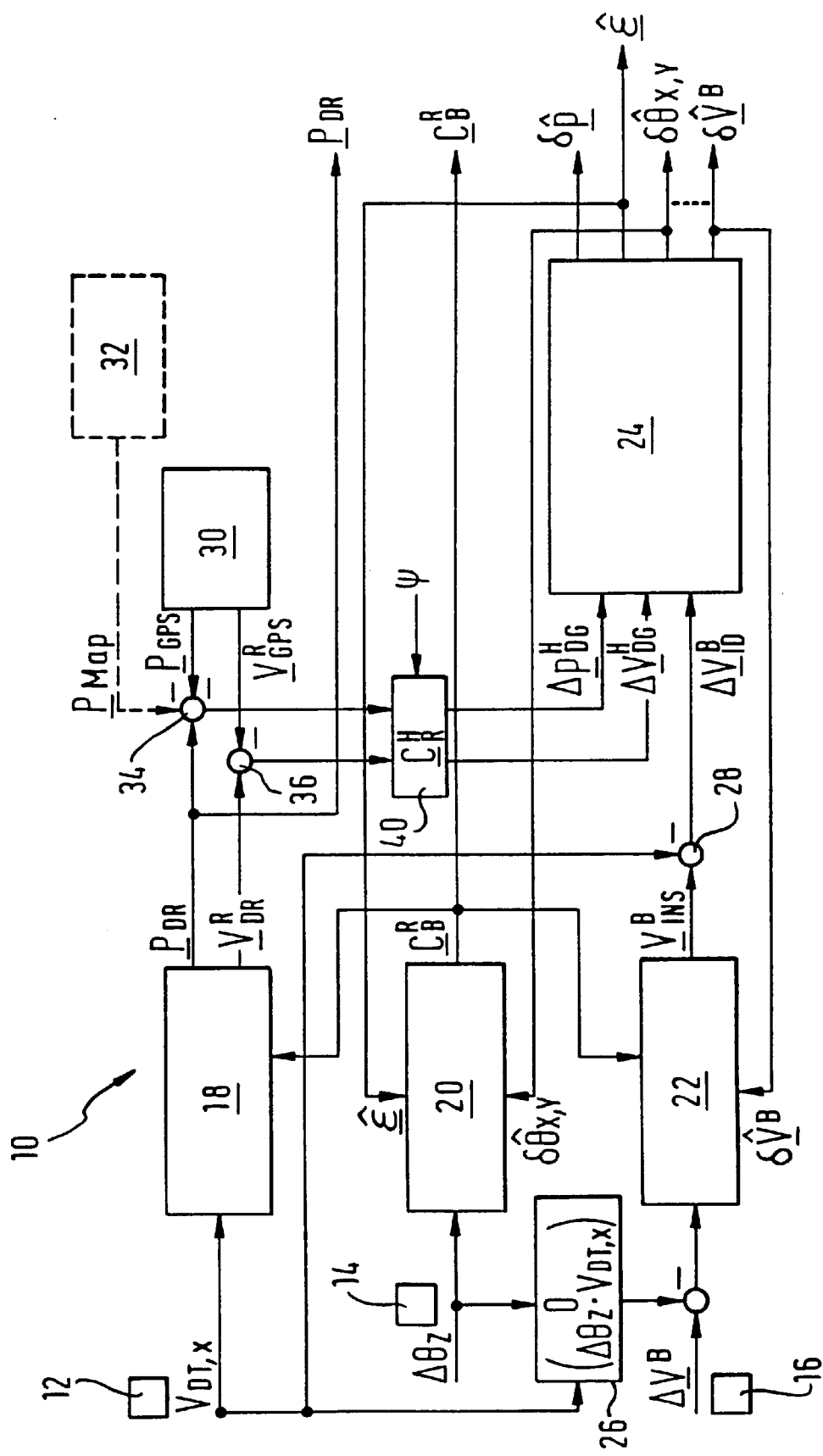
FIG. 3 is a block diagram of an alternative embodiment of a signal processing structure for a navigation system in accordance with the invention.

FIG. 3 is a block diagram of a signal processing structure for a navigation system in accordance with an alternative embodiment of the invention. This figure shows a further design variant of the navigation system 10 with identical parts having the same reference symbols as in FIG. 1. The design variant shown in FIG. 1 also has a transformation element 40 which transforms the position $\Delta P$ and velocity $\Delta v$ observations supplied to the Kalman filter 24, via a matrix, into a vehicle-axis coordinate system, so that the error states that have already been transformed to the vehicle-axis system within the position filter can likewise employ observations transformed into the vehicle-axis system. This makes it possible to simplify the error model further.

The embodiment of FIG. 3 allows the error state of the position filter to be split into its along-track error, the along-track position error and the distance-travelled sensor scale factor error $\delta SF_{DT}$, and its cross-track error, the cross-track position error $\delta_{Py}$, the azimuth error $\epsilon_D$ and the z gyro error, the drift error $D_z$ and the scale factor error $\delta SF_{GZ}$.

Figure 4:
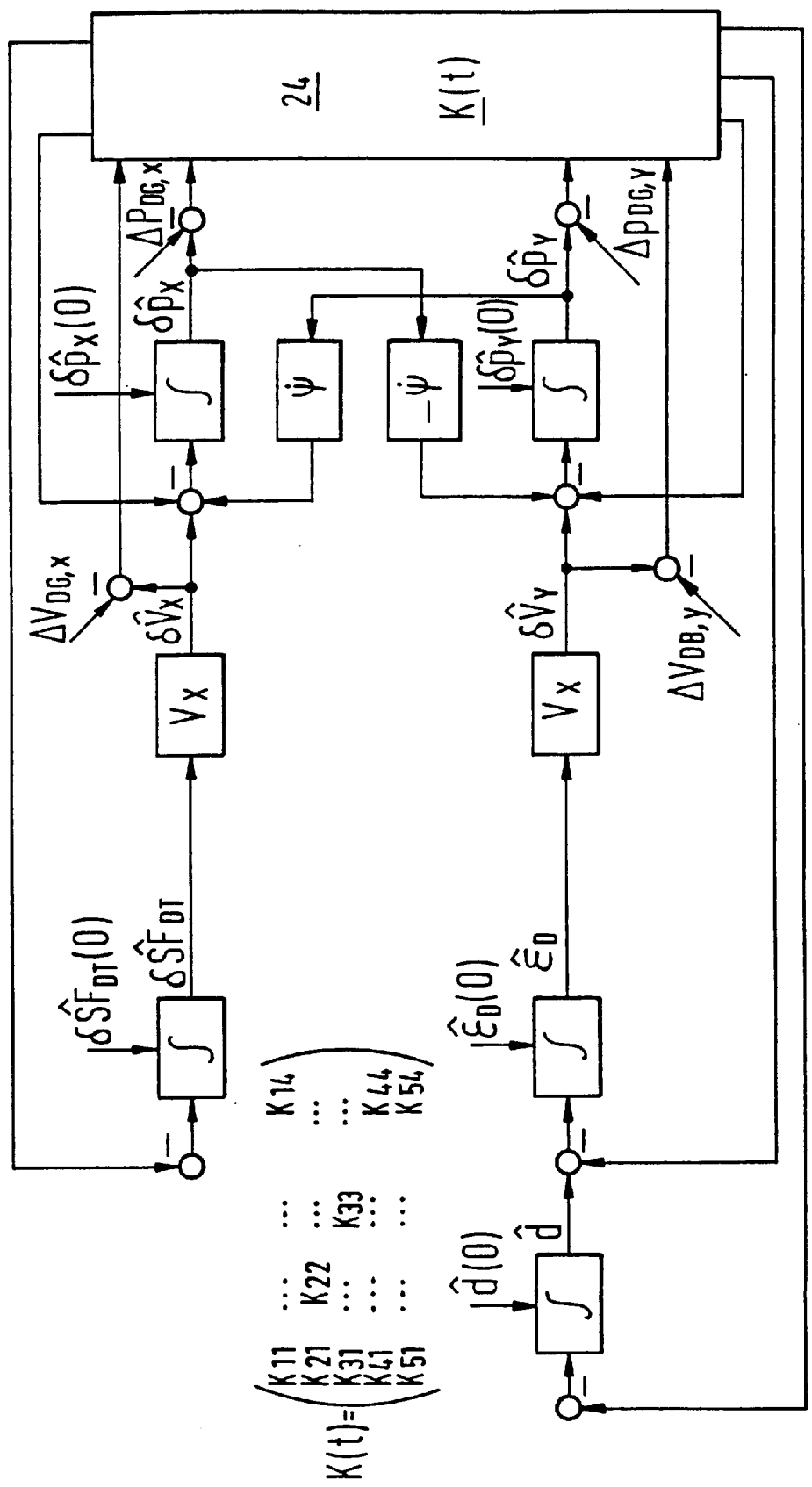
FIG. 4 is a model of the arrangement of a position filter for an error estimation equation.

FIG. 4 is a model of the arrangement of a position filter for an error estimation equation. The figure shows the estimated error equation for the position filter in continuous form, that is, in the form with an error state transformed into a vehicle-axis representation. Since the error state of the scale factor error of the z gyro can be ignored in the following error analysis, this is not considered any further to simplify the description.

Figure 5:
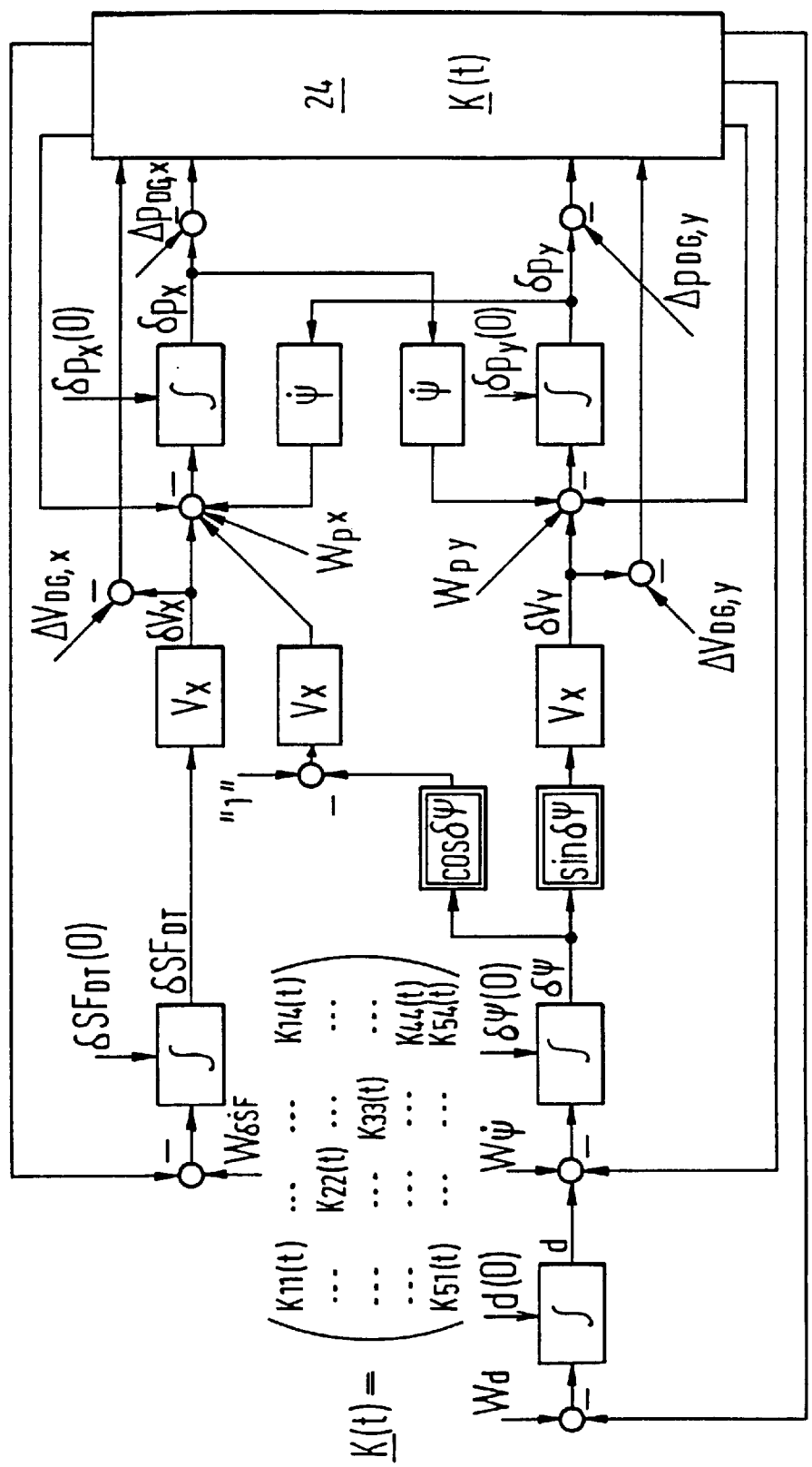
FIG. 5 is an overall error model for horizontal navigation.

FIG. 5 is an overall error model for horizontal navigation using supported integrated navigation. The error model of FIG. 5 thus comprises the non-linear navigation algorithms in conjunction with the position filter. It is based upon a linear model, as a partial filter in the Kalman filter 24, with feedback of the estimated filter values to correct the navigation algorithms.

The differences between the error models illustrated in FIGS. 4 and 5 may be described as follows. In the case of the error model show n in FIG. 4, the estimated error values are illustrated, while the error states illustrated in FIG. 5 describe the total error in the calculated navigation parameters in comparison to actual navigation parameters. The error model of FIG. 5 contains non-linear blocks of the azimuth error $\delta\Psi$ with the characteristic that, for small azimuth errors $\delta\Psi$, the estimated error equation according to FIG. 5 is equivalent to the structure of the estimated error equation according to FIG. 4.

The analysis of the overall error model according to FIG. 5 indicates that the navigation system 10 malfunctions whenever the azimuth error $\delta\Psi$ assumes large values. On the one hand, the error model may become unstable for large values of the azimuth error $\delta\Psi$ greater than 90° while, on the other hand, the distance-travelled sensor scale factor may be decalibrated for large azimuth errors $\delta\Psi$ via the additional coupling to the along-track partial filter in the position filter. An azimuth error $\delta\Psi$ may be caused by a large initial error $\delta\Psi(0)$ or by support with a very large position error. Both error causes occur, for example, as a result of incorrect inputs or after the vehicle has been transported with the navigation system 10 switched off with possible automatic GPS support after being switched on again, since the navigation result from before it was last switched off is always stored for normal operating states.

In order to avoid decalibration of the position filter and, thus, the overall navigation system 10, the position filter is monitored while the vehicle is in the operating state (characterized by motion) within its linear operating range. In this situation, every supporting position supplied to the position filter, as shown in FIGS. 4 and 5, is checked for plausibility. Only if the plausibility conditions are satisfied is the position support implemented. If the plausibility conditions are not satisfied, the navigation system 10 is initialized using the supporting position, and the position filter is set to a predetermined status (default status).

Once the navigation system 10 has been switched on, the initial position support is employed for initialization and the position filter is set to the default status. In principle, unless an azimuth input is made or a correction is applied by azimuth monitoring, the azimuth is retained in this case.

Azimuth monitoring may be carried out so that, in addition to the supported navigation calculation, an unsupported control navigation calculation is carried out that is matched to the supported navigation calculation at each control point. The unsupported control navigation calculation is compared to an independently-determined rough azimuth. The rough azimuth may be determined, for example, by triangulation using two reference points provided, for example, via the GPS receiver 30 and/or map points 32, or may be read out directly as a GPS azimuth, and/or may be determined from the GPS velocity.

If the determined azimuth error is sufficiently small, the navigation calculation can continue. If not, the calculation is initialized to the rough azimuth using the reference position and the position filter is set to the defined default status. The control navigation calculation is restarted, after each control point, after comparison to the supported navigation calculation. The position filter default status, mentioned above, results in all the sensor calibration values being reset to specific, stored values that have previously been checked for correctness. Very advantageously, these may be sensor calibration values determined using the last control navigation calculation carried out which did not lead to the position filter being reset to the default status. For the position filter to achieve an adequate learning capability, the covariance matrix of the position filter is diagonalized and filled with suitable default values of the main diagonal.

Statistical error assessment methods, which use the covariance information calculated in the Kalman filter 24 for the estimated filter parameters for self-diagnosis, may be used in a highly advantageous manner for plausibility checking of the supporting positions and azimuth monitoring.

If monitoring of the linear operating range of the position filter has been based so far on a vehicle operating state characterized by driving, the position filter can also be modified so that monitoring of the linear operating range can also be accomplished when the vehicle is in an operating state indicating that it is stationary. The vehicle motion state which indicates that it is stationary can be identified and monitored by means of an algorithm triggered by evaluation of the navigation system sensors. When the stationary state is detected, the position is constant, the velocity is equal to zero, and the azimuth is likewise constant.

Figure 6:
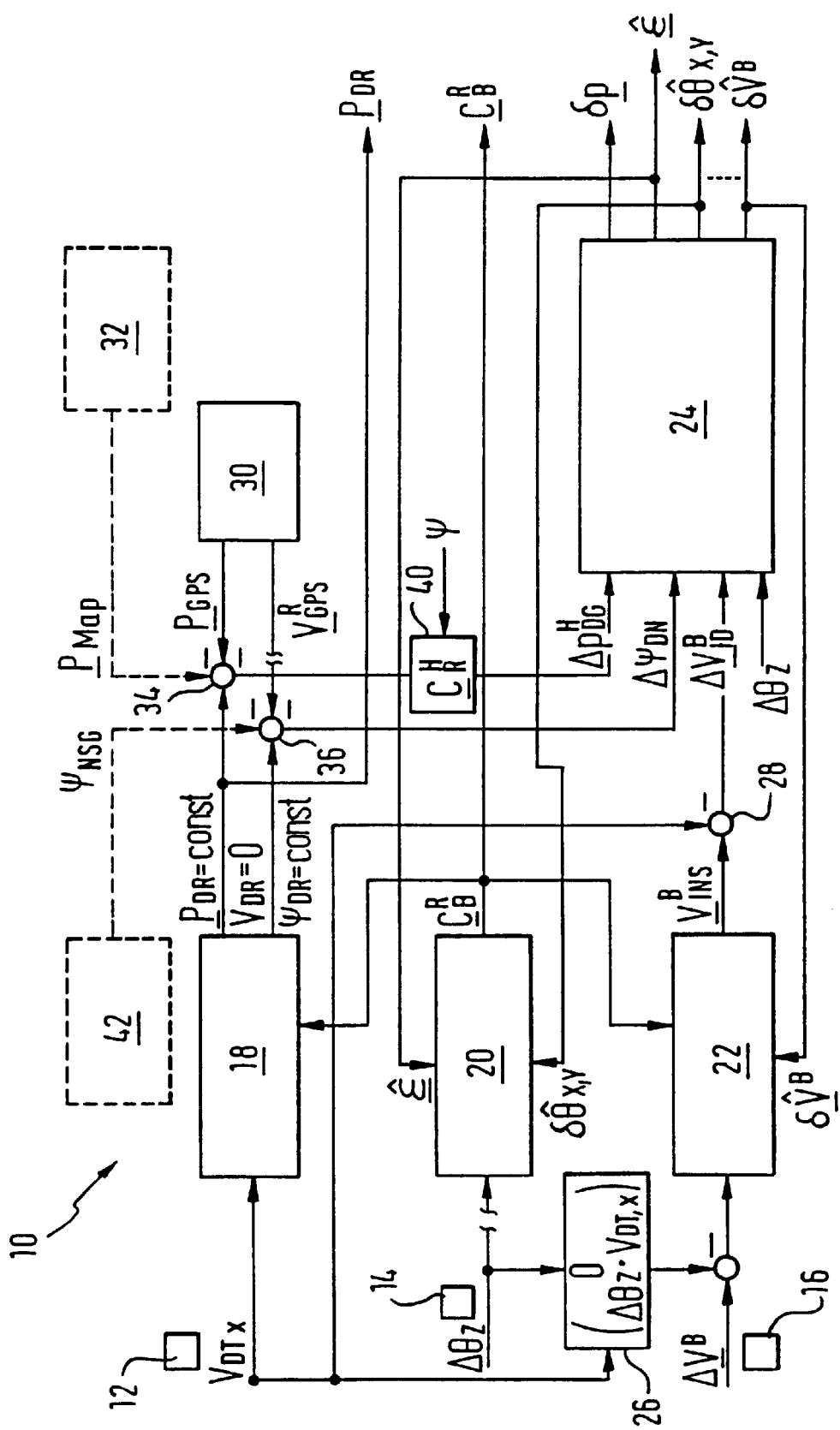
FIG. 6 is a block diagram of a signal processing structure for a navigation system in accordance with a further exemplary embodiment of the invention.

FIG. 6 is a block diagram of a modified signal processing structure for the supported integrated navigation calculation which is matched to the state that indicates that the vehicle is stationary. Parts identical to those of the preceding figures are once again given like reference symbols.

On the basis of the above definition of the stationary state, the integrated track is constant. The measurement signals provided from the z gyro 14 are thus no longer supplied, interpreted as an error signal, to the track/attitude calculation 20 but only directly as a monitor to the Kalman filter 24.

Furthermore, the velocity measurement provided by the GPS receiver 30 per se is no longer available when the vehicle is stationary. For equipment configurations which (optionally) include a North-seeking gyro as an additional assembly, the azimuth provided from the integrated navigation calculation device 18 can be compared, when stationary, with that from the North-seeking gyro 42 so that an azimuth correction can be determined from the integrated track and the measured value supplied from the North-seeking gyro 42 and passed as an observation to the Kalman filter 24.

Figure 7:
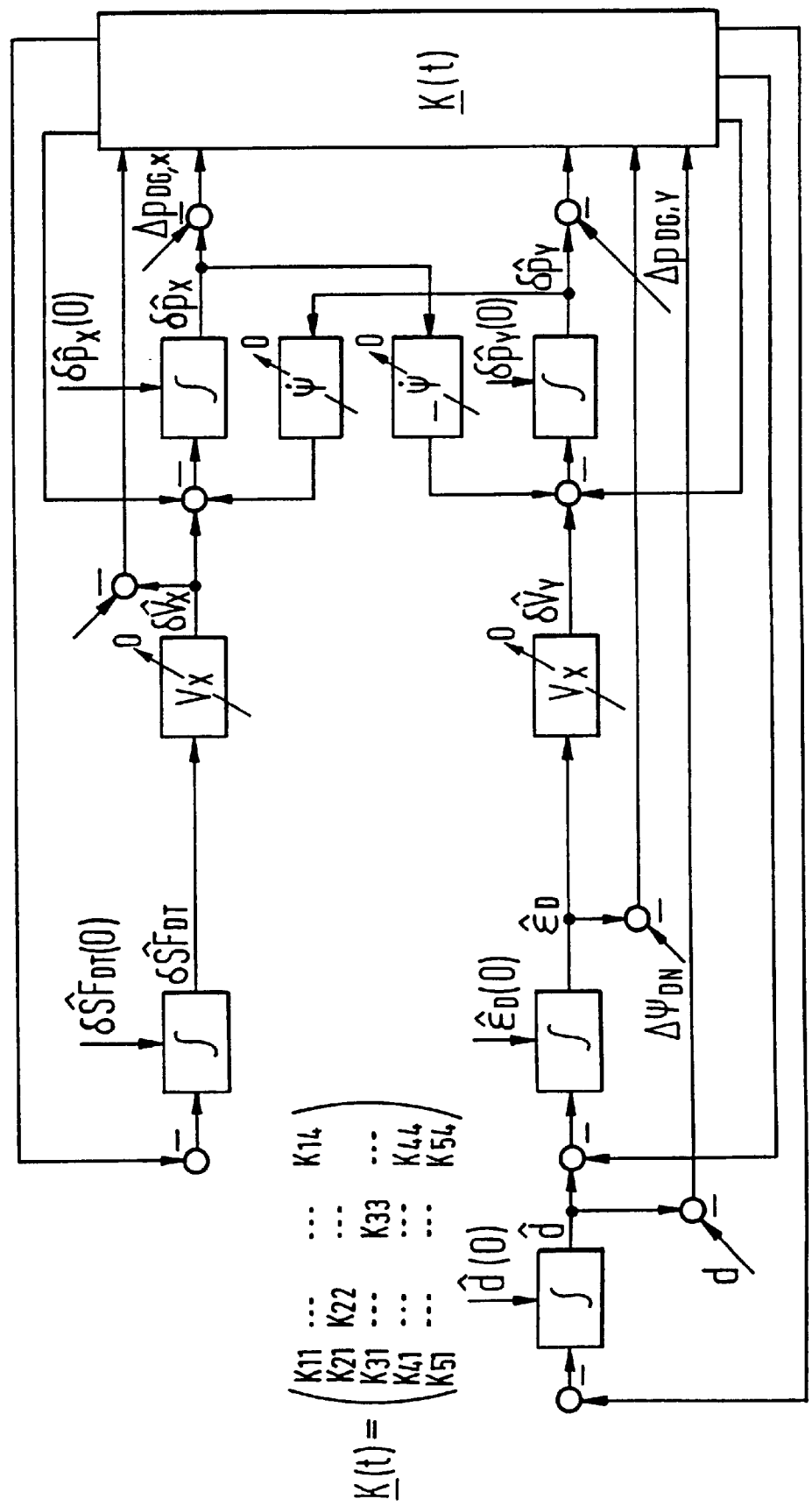
FIG. 7 is a model of the arrangement of a position filter for an error estimation equation for a position filter according to FIG. 6.

FIG. 7 is a model of the stationary vehicle state and of the modification of the navigation algorithm shown in FIG. 6 to the estimated error equations in the position filter. In this case, the following differences become clear in comparison to the estimated error equations according to FIGS. 4 and 5. As a result of the fact that the vehicle is stationary, a continuous measured value is available from the z gyro 14 as a filter monitor, so that gyro drift can be estimated continuously when the vehicle is stationary. If position and/or azimuth measurements are available, these may also result in an improvement in the other estimate variables in addition to an improvement in the associated estimated variables by averaging, since cross-correlations can be set up between the individual error states from an unsupported period of driving prior to the vehicle being stationary.

Furthermore, by continuing monitoring of position and azimuth support, as was carried out during the signal processing in the vehicle state indicating motion, it is possible to ensure that the position filter is not operated outside the permissible linear operating range. In contrast to the driving operating state, however, in the operating state when the vehicle is stationary there is no need to include the drift state and associated correlation in the resetting of the position filter to the default status.

Thus, overall, since the signals supplied from the z gyro 14 are passed as a direct observation to the Kalman filter 24 when the vehicle is stationary, it is possible to carry out a continuous estimate of gyro drift when the vehicle is stationary. At the same time, the maintenance of the structure of the position filter, as shown in FIG. 7, ensures that position and/or azimuth support may result in corrections for all error states providing appropriate cross-correlations have been set up, for example, in a previous period of unsupported driving.

Continuing the position and azimuth monitoring even during the stationary state avoids decalibration of the position filter. In this case, the definition of the already-explained default status of the position filter must take into account that decalibration of the drift estimate is impossible, and, therefore, the drift state with the associated covariance must be excluded from resetting to default status when the vehicle is stationary.

The navigation system of the invention makes it possible to reduce errors caused by the non-linear character of the track/attitude calculation and the linear approximation of the error model in the Kalman filter. In particular, in the case of vehicles having a limited attitude angle range (e.g. land vehicles), a navigation system instrumentation with only one gyro, assigned to the vehicle vertical axis, is possible. As a result of the fact that the Kalman filter is assigned at least one partial filter, of which a first partial filter is used for dynamic levelling and/or a second partial filter is designed as a position filter, it is possible to carry out methods that reduce errors caused by the absence of gyros assigned to the horizontal vehicle plane. It is furthermore possible to monitor the calibration state, in particular the azimuth alignment related to a system decalibration caused by non-linear effects (i.e. track decalibration, position decalibration and sensor decalibration), making it possible to identify and overcome decalibration. Furthermore, the linear error model can be retained in such case in a highly advantageous manner as the basis of the Kalman filter to avoid the increased numerical and analytical complexity for implementation of a Kalman filter using a non-linear model.

While this invention has been described with reference to its presently-preferred embodiment, it is not limited thereto. Rather, the invention is limited only insofar as it is defined by the following set of patent claims and includes within its scope all equivalents thereof.

What is claimed is:

1. In a navigation system for a vehicle of the type having at least one single-axis gyro for the vehicle vertical axis z, and x and y axis accelerometers in the horizontal vehicle plane, a vehicle-fixed velocity measurement device and an augmentation device, especially at least one of satellite navigation receiver or a map device, for augmenting position or velocity of the vehicle or both and a controller for correcting at least one of the calculated vehicle position and direction of travel via a suitable Kalman filter using measured signals supplied from said augmentation device comprising, in combination:
    a) a Kalman filter partitioned into at least a first partial filter for dynamic levelling; and
    b) and a second partial filter designated as a position filter for providing track calibration, position calibration and sensor calibration.

2. A navigation system as recited in claim 1 further characterized in that:
    a) said partial filter for dynamic levelling being arranged to carry out rotation rate estimation in the vehicle-fixed horizontal plane; and
    b) said estimated values obtained being fed back almost continuously to said navigation system.

3. A navigation system as recited in claim 2 further including means for providing that said estimated values are fed back with a suitable bandwidth for a predetermined application.

4. A navigation system as recited in claim 2 further including means for providing that estimated values equivalent to the rotation rate estimated values are fed back.

5. A navigation system as recited in claim 4 further including means for providing that estimated values of the discrete angular increments in said horizontal vehicle x and y agues are fed back.

6. A navigation system as recited in claim 2 wherein the order of the partial filter matches a definition of the error states.

7. A navigation system as recited in claim 6, characterized in that the partial filter for dynamic levelling is based on a discrete sixth order error model formulated as follows:

$$\begin{bmatrix} \delta c_{31} \\ \delta \theta_y \\ \delta v_x \\ \delta c_{32} \\ \delta \theta_z \\ \delta v_y \end{bmatrix}_k = \begin{bmatrix} 1 & -c_{33} & 0 & \Delta\theta_z & 0 & 0 \\ 0 & 1 & 0 & 0 & 0 & 0 \\ g\Delta T & 0 & 1 & 0 & 0 & 0 \\ -\Delta\theta_z & 0 & 0 & 1 & c_{33} & 0 \\ 0 & 0 & 0 & 0 & 1 & 0 \\ 0 & 0 & 0 & g\Delta T & 0 & 1 \end{bmatrix}_{k-1} \cdot \begin{bmatrix} \delta c_{31} \\ \delta \theta_y \\ \delta v_x \\ \delta c_{32} \\ \delta \theta_z \\ \delta v_y \end{bmatrix}_{k-1} + \underline{w}_{k-1}$$

$$\delta_{\underline{x}_x} = \Phi_{k-1} \qquad \delta_{\underline{x}_{k-1}} + \underline{w}_{k-1}$$

$$\begin{bmatrix} \Delta v_z \\ \Delta v_y \end{bmatrix}_k = \begin{bmatrix} 0 & 0 & 1 & 0 & 0 & 0 \\ 0 & 0 & 0 & 0 & 0 & 1 \end{bmatrix} \cdot \delta_{\underline{x}_k} + \underline{v}_k$$

8. A navigation system as recited in claim 1 characterized in that:
    a) said partial filter for dynamic levelling comprises two stationary third order Kalman filters; and
    b) couplings between said third order partial filters comprise deterministic input signals.

9. A navigation system as recited in claim 8 characterized in that said partial filter for dynamic levelling is integrated in said Kalman filter.

10. A navigation system as recited in claim 1 characterized in that the stochastic model in the Kalman filter is adaptive, having frequency-band-selective assessment of the translational disturbances in the acceleration measurements.

11. A navigation system as recited in claim 1 further including:
    a) means for checking the probability of supporting positions used in said second partial filter, designed as a position filter; and
    b) means for resetting said position filter to a defined status using stored and verified sensor calibration values if the augmentation positions are not probable.

12. A navigation system as recited in claim 11 further including means for setting the position filter to default status when said position filter is first switched on.

13. A navigation system as recited in claim 11 further including means for azimuth monitoring.

14. A navigation system as recited in claim 13 further including:
    a) means for performing statistical error assessment steps for said plausibility check and said azimuth monitoring; and
    b) said statistical error assessment means employs said covariance information calculated in said Kalman filter for said filter estimated parameters as self diagnosis.

15. A navigation system as recited in claim 11 further including:
    a) means for carrying out an unaided control navigation calculation in addition to said aided navigation calculation; and
    b) means for matching said unaided control navigation calculation to said aided navigation calculation at each control point; and
    c) means for using said stored and verified sensor calibration values from the last control navigation calculation that did not lead to said resetting of said position filter.

16. A navigation system as recited in claim 11 further including:
    a) means for performing a position filter changeover when an algorithm detects said vehicle is stationary; and
    b) said last-named means includes means for connecting a measured value from a z gyro as observations to said Kalman filter.

* * * * *